US009280542B2

(12) United States Patent
Oules

(10) Patent No.: US 9,280,542 B2
(45) Date of Patent: Mar. 8, 2016

(54) PROCESS FOR CREATING A MEDIA SEQUENCE BY COHERENT GROUPS OF MEDIA FILES

(75) Inventor: Guillaume Oules, Paris (FR)

(73) Assignee: Orange, Paris (FR)

( * ) Notice: Subject to any disclaimer, the term of this patent is extended or adjusted under 35 U.S.C. 154(b) by 251 days.

(21) Appl. No.: 13/086,725

(22) Filed: Apr. 14, 2011

(65) Prior Publication Data

US 2011/0276864 A1 Nov. 10, 2011

(30) Foreign Application Priority Data

Apr. 14, 2010 (FR) ...................................... 10 52852

(51) Int. Cl.
*G06F 17/00* (2006.01)
*G06F 17/30* (2006.01)

(52) U.S. Cl.
CPC ...... *G06F 17/30017* (2013.01); *G06F 17/3005* (2013.01); *G06F 17/30053* (2013.01); *G06F 17/30056* (2013.01); *G06F 17/30058* (2013.01); *G06F 17/30064* (2013.01); *G06F 17/3002* (2013.01); *G06F 17/30023* (2013.01); *G06F 17/30026* (2013.01); *G06F 17/30029* (2013.01); *G06F 17/30038* (2013.01); *G06F 17/30047* (2013.01)

(58) Field of Classification Search
CPC .......... G06F 17/30023; G06F 17/3002; G06F 17/30026; G06F 17/30029; G06F 17/30038; G06F 17/30047; G06F 17/3005; G06F 17/30053; G06F 17/30056; G06F 17/30058; G06F 17/30064; G06F 17/30017
USPC .................................................. 715/201, 202
See application file for complete search history.

(56) References Cited

U.S. PATENT DOCUMENTS

| | | | | |
|---|---|---|---|---|
| 6,072,480 A | * | 6/2000 | Gorbet et al. ................. | 715/730 |
| 6,121,963 A | * | 9/2000 | Ange ............................ | 715/202 |
| 2002/0051076 A1 | * | 5/2002 | Fauvarque et al. ......... | 348/387.1 |
| 2003/0046010 A1 | * | 3/2003 | Parida ............................ | 702/20 |
| 2004/0197071 A1 | * | 10/2004 | Zhang et al. .................... | 386/46 |
| 2005/0091596 A1 | * | 4/2005 | Anthony et al. .............. | 715/712 |
| 2005/0154754 A1 | * | 7/2005 | Sheldon et al. ............... | 707/102 |

(Continued)

FOREIGN PATENT DOCUMENTS

EP 1 465 196 A1 10/2004

OTHER PUBLICATIONS

French Search Report, dated Feb. 22, 2011, from corresponding French application.

*Primary Examiner* — Nathan Hillery
(74) *Attorney, Agent, or Firm* — Knobbe Martens Olson & Bear LLP

(57) ABSTRACT

A process for creating a media sequence, for example video or audio, and an associated device includes the stages of:
  obtaining a selection of media files;
  regrouping the chosen media files into a plurality of groups according to at least one coherence criterion;
  selecting, for each group of media files assembled in this way, a media motif among a plurality of predefined media motifs, the chosen media motif being able to define a media rendering for the set of media files of the group; and
  assembling the media motifs selected in this way and their associated media files in such a way as to form at least one definition of the media sequence. The process can relate to automated video editing as implemented on Web servers.

15 Claims, 6 Drawing Sheets

(56) References Cited

U.S. PATENT DOCUMENTS

| | | | |
|---|---|---|---|
| 2007/0168413 A1* | 7/2007 | Barletta et al. | 709/203 |
| 2008/0215979 A1 | 9/2008 | Clifton et al. | |
| 2009/0187838 A1* | 7/2009 | Thomes et al. | 715/764 |
| 2009/0187856 A1* | 7/2009 | Rapo et al. | 715/810 |
| 2010/0296748 A1* | 11/2010 | Shechtman et al. | 382/254 |
| 2011/0044549 A1* | 2/2011 | Bressan | 382/225 |
| 2011/0182352 A1* | 7/2011 | Pace | 375/240.1 |
| 2011/0225153 A1* | 9/2011 | Haseyama | 707/736 |

\* cited by examiner

| Name | URL | Time | Dating | Tags | Score |
|------|-----|------|--------|------|-------|
| MEDIA 1 | ./media/media1.mov | 1:20 | 25/5/09 12:00 | Vacation, Italy, Sicily | 1 |
| MEDIA 2 | ./media/media2.jpg | - | 25/5/09 13:10 | Vacation, Italy, Sicily, Palermo | 4 |
| ... | ... | ... | ... | ... | ... |
| MEDIA N | ./media/mediaN.jpg | - | 2/3/09 17:00 | Laboratory, Paris | 2 |

(C1)  (C2)  (C3.1)  (C3.2)

(C3)

```
1  <central>
2  <front multimedia="true">
3  <display>
4     <effect type="rotator" duration="5">
5       <image filename = "">
6         <filter type="frame"/>
7       </image>
8     </effect>
9  </display>
10 </front>
11 <back>
12 <display>
13    <effect type="kenburns" duration="6" depthEnable="false">
14      <image filename = "">
15        <filter type="hblur" diameter="10.0"/>
16        <filter type="vblur" diameter="10.0"/>
17      </image>
18    </effect>
19 </display>
20 <display>
21    <effect type="kenburns" duration="6" depthEnable="false">
22      <video filename = ""/>
23    </effect>
24 </display>
25 </back>
26 <link>
27 <transition type="crossfade" duration="2"/>
28 </link>
29 </central>
30 <transition type="crossfade" duration="2"/>
31 <outro>
32    <effect type="kenburns" duration="4">
33      <image filename = ""/>
34    </effect>
35 </outro>
```

Figure 5

PROCESS FOR CREATING A MEDIA SEQUENCE BY COHERENT GROUPS OF MEDIA FILES

FIELD OF THE INVENTION

This invention relates to a process for creating a media sequence, and an associated device.

More precisely, it relates to automated media editing such as can be implemented especially on Web servers. The idea of "media" here relates to different forms that digital data can take, i.e., mainly video, audio or multimedia (video and audio) content.

BACKGROUND OF THE INVENTION

Many Internet sites, such as Stupeflix and Animoto (commercial names), offer such a service for generating edited films. This service is designed especially for making, with a minimum of interactions for the user, a film of memories that may be different each time, even if the set of memories used remains the same.

Generally, the memories used are media files such as videos, images, audio files or even text files. Of course, any piece of data that can be converted and integrated into a video sequence can be considered within the framework of the creation of video sequences.

The approach that was developed by Animoto and that is described in the publication WO 2008/109233 or US 2008/0215979 makes it possible to generate video miniclips accompanied by music chosen in a catalog.

It provides for the user to load a set of visual media files that will comprise his memories to be edited, and specifies an audio file from which the editing is done. The editing then consists in automatically choosing the video motifs corresponding to a visual rendering for one or more media files, and then in assigning the visual media files to these video motifs.

In detail, several groups of media files can be formed, either by the choice of the user or by image analysis. The video motifs are then selected, group after group, by successive routes through a binary tree of the motifs. This binary tree is based on the "portrait" orientation, called P, or "landscape" orientation, called L, of media files, and stores different available motifs at the level of its nodes.

For one group or for media files remaining to be processed that follow, for example, the following orientation configuration LPLLPLLLLPPPLPLLPL, all of the motifs available to the corresponding nodes, in the example the nodes L, LP, LPL, LPLL, . . . , are considered for determining a better video motif, after weighting calculations and random calculations.

Alignment of these groups on an audio file breakdown according to its rhythm, moreover, makes it possible to obtain synchronization between the visual rendering and the audio rendering of the film that has been edited in this way.

For the user, the main defect is the general slowness of this approach for generating an edited film. This slowness can originate especially from the extensive necessary processing, such as, for example, the route through the binary tree, and the large number of video motifs then obtained from which the weighting calculations and random calculation are made.

Moreover, it could be noted that the rendering of the edited film is not satisfactory for the user. Actually, the coherence of the visual rendering between the displayed media files is not optimum, even while the user could specify it manually or it could be determined by analysis via regroupings of media files.

SUMMARY OF THE INVENTION

For this purpose, the invention is intended to eliminate at least one of the defects of the techniques of the prior art by proposing especially a process for creating a media sequence based on media files, comprising the following stages consisting in:

Obtaining a selection of media files;
Regrouping the chosen media files into a plurality of groups according to at least one coherence criterion;

characterized in that it, moreover, comprises stages consisting in:

Selecting, for each group of media files assembled in this way, a media motif among a plurality of predefined media motifs, said chosen media motif being able to define a media rendering for the set of media files of said group;
Assembling the media motifs selected in this way and their associated media files so as to form at least one definition of the media sequence.

The media files, for example video motifs or audio motifs, are models or patterns that define a visual/audio rendering for the media files to be specified using visual and/or audio effects.

The definition formed according to the invention can be especially a representation of the structure of the media sequence, for example in file form. This definition can then be used by a media sequence generation engine to generate specifically the sequence corresponding to this definition.

Of course, the media sequence can be directly generated by assembling media motifs and their associated media files, said definition then being inherent in the generated sequence.

The process according to the invention thus offers coherence of media rendering (visual or audio, for example) that is enhanced for the media files within the video sequence. Similarly to the Animoto approach, a start of media coherence is obtained by the regrouping of media files, for example according to at least one piece of data associated with said media files.

The enhanced coherence of the media rendering according to the invention is, moreover, obtained by the fact that a single media motif is chosen for a group that has been defined in this way. Actually, the inventors have especially noted that the destruction of visual coherence in Animoto seems to result from the possible use of any motif available to various nodes traversed in the aforementioned binary tree.

Thus, in contrast to the Animoto approach, the invention ensures that the media coherence provided by the designer within each media motif is preserved for the totality of one group of media files.

In one embodiment, the stage for selection of one media motif comprises one stage for determination of a subset of media motifs that each define a media rendering for a number of media files that is compatible with the number of media files comprising said corresponding group, said selected media motif then being selected within said determined subset. This arrangement thus consists in verifying that the retained media motifs make it possible to offer a media rendering for the set of media files of the group under consideration, the other motifs not being able to ensure this media rendering for the entirety of the group and thus the media coherence obtained by the implementation of the invention. By selecting solely these media motifs, in particular the volume of motifs processed during the effective selection of the motif to obtain the media file rendering of the group is reduced. Thus, the calculation load for this selection is reduced.

In particular, the number of media files, or size of a motif, of which one media motif can jointly define the media rendering, is variable over a range of values by repetition of at least one constituent elementary component of the media motif, and said stage of determination consists in determining the media motifs whose associated range of values includes the number of media files of said group.

The use of media motifs of variable size according to this arrangement makes it possible to define the media rendering (visual and/or audio) of groups for several sizes of them (number of media files comprising them). Thus, a smaller number of media motifs can be used to describe the groups of media files; this reduces the memory space required for their storage and the calculations to be carried out on them.

Moreover, the compatibility introduced above between the size of the media motifs and the size of the groups of media files is such that only the media motifs are preserved that can offer a visual rendering for the entire group of media files.

According to one particular characteristic of the invention, the selection of the media motif within said determined subset is a function of a random value, for example by random determination according to a probability distribution on the media motifs of said subset. This characteristic in particular makes it possible to offer a new edited film that is coherent in terms of media rendering (visual or audio) for each user request, even if an identical set of media files is used for the new film request. Moreover, the determination can be a function of weighting linked to each media motif of said subset. In this case, said aforementioned probability distribution takes into account this weighting. This allows certain media motifs to be favored.

According to one characteristic of the invention, the regrouping stage comprises stages that consist in running through the media files in a chronological order and in regrouping the media files according to two combined time criteria: a time gap relative to the oldest media file in the group and a time gap relative to the last media file inserted into the group. "Time gap" is defined as the time interval separating two media files, for example in view of the dating information specific to the latter. The "last media file" is consequently the most recent, due to the path in chronological order. This configuration ensures high coherence in the rendering of the media sequence created by the invention on the basis of "time coherence."

Actually, the "time proximity" between the media files is generally accompanied by high coherence between them. The invention here calls for combining two time criteria in order to optimize a regrouping by time coherence taking into account a "global time envelope" within which all the regrouped media files are included (for example, 24 hours), and taking into account possible major pauses in this envelope symbolizing a rupture of coherence (for example, more than 30 minutes passed since the last media file). Of course, these criteria can be adjusted by the user according to the particular case, or can be modified by training for reflecting, for example, relatively long pauses, to other grouped media files or a time envelope in proportion to the time range covered by the set of media files.

In particular, the regrouping of the media files is done by taking into account a criterion of similarity between the description data associated with the media files of the group, taken two by two. This arrangement makes it possible to introduce semantic coherence (use of keywords) and/or geographic coherence (use of geolocation data) in addition to the aforementioned "time coherence." The media sequence created in this way then offers a rendering that is all the more coherent since the invention makes it possible here to detect possible contemporary media files, but of very distinct subjects, for example because they relate to two simultaneous events at two distinct locations.

According to one particular characteristic, the regrouping stage comprises a stage for forming groups of media files according to said at least one coherence criterion and a stage for fusion of adjacent groups that have been formed in this way and that each comprise fewer media files than a predefined fusion threshold value. For example, there is the case of a threshold value equal to 2; this amounts to fusing adjacent singletons (groups comprised of a single media file).

This arrangement tends to reduce the processing to be carried out to initiate the selection of the media motifs since the media of the adjacent fused groups are processed together.

Advantageously, this reduction of processing is accompanied by maintaining the coherence of the media rendering for the generated sequence (i.e., the global impression that emerges from this sequence for a user), despite the fact that the original and ultimately fused media files have little coherence at the base (because the corresponding groups are of very small size).

Moreover, it can likewise be provided that the regrouping stage comprises a stage for forming groups of media files according to said at least one coherence criterion and a stage for subdividing a group formed in this way as a function of the number of media files that comprise said group and a predefined subdivision threshold value in such a way as to obtain a plurality of subdivided groups composed of a number of media files that is less than said predefined subdivision threshold value, with, for example, a subdivision threshold value that is equal to 10. Of course, the subdivision operation can be carried out recursively.

This arrangement makes it possible to reduce the number of media motifs that are able to be used to form the final sequence. This then results in a simplification of their establishment, in a reduction of the memory space used, and in a reduction of the calculations to be carried out on each of these motifs (selection of compatible video/audio motifs, and then effective selection of the motif retained for the media rendering).

Moreover, a certain uniformity of the durations of the (multi)media effects (corresponding to the selected media motifs) linked in the sequence is guaranteed since the length of the media motifs used is henceforth limited by this subdivision threshold value.

In one embodiment of the invention, one media motif comprises at least one elementary component that is designed to receive the identification of a media file for defining the media rendering of this media file, and the process comprises a stage for adjustment of the media motif selected by repetition of said at least one elementary component in such a way as to obtain an adjusted media motif having one elementary component for each media file of said corresponding group.

This arrangement expresses the possibility of repeating the same elementary component within the motif in order to adapt it to describe the set of media files of the group to be processed. The advantages of reducing the number of media motifs for describing all of the groups and thus of the required memory space and calculations to be carried out (as indicated above) likewise arise here.

In another embodiment of the invention, one media motif is composed of an initial time sequence of elementary components designed to each receive the identification of a media file, followed by a stack of at least two intermediate time sequences of elementary components, followed itself by a final time sequence of elementary components. A stack of several sequences can correspond especially to sequences that have been positioned according to several superimposed shots in the created sequence, for example a foreground and a background. As a variant, these sequences of the stack can correspond to various spatial positions in images of the video sequence.

This configuration of the video sequence in two time sequences interrupted by a stack of sequences reflects a coherent composition for the presentation of media files: one single introduction and one single conclusion, interrupted by more complex editing.

According to one characteristic of the invention, the process is implemented using object-oriented programming provided with classes of objects defining the predefined media motifs and the elementary components that comprise them. This arrangement reflects the use of the object-oriented programming by this invention. This programming in particular has the advantage of offering very efficient performances of execution on current information technology systems, ensuring in this way prompt creation of a video film, for example.

In particular, this arrangement offers simple correspondence between the manipulated objects and the elements generally taken into account by the video sequence generation servers based on a definition file (for example XML) of the sequence, such as Stupeflix. This simple correspondence then allows prompt generation of the definition file at no cost, once the media sequence is defined using objects.

In particular, the assembly of media motifs comprises, for each group of media files, the construction of a portion of the media sequence corresponding to said group by duplication of the objects comprising the media motif selected for said group and by indication, in these objects, of the identifications of the media files of said group, and it comprises the conversion of the objects associated with each portion into one structured definition file of the media sequence.

Moreover, said conversion of objects comprises calling on a method for serialization of objects into an XML-type computer marking language. By virtue of its broad dissemination, the XML language allows simple interpretation at the level of any information technology system. This arrangement, moreover, allows integration directly into the edited film generation systems based on definition files and associated media files, such as, for example, a Stupeflix server.

Correlatively, the invention relates to a device for creation of a media sequence based on media files, comprising:
A means for obtaining one selection of media files;
A module for regrouping of selected media files into a plurality of groups according to at least one coherence criterion;
characterized in that it, moreover, comprises the following:
A selection means for selecting, for each group of media files that has been constructed in this way, one media motif among a plurality of predefined media motifs, said selected media motif being able to define a media rendering for the set of media files of said group;
A means for assembling the media motifs that have been selected in this way and their associated media files so as to form at least one definition of the media sequence.

The creation device has advantages similar to those of the aforementioned process, especially offering enhanced coherence of the video films that have been edited in this way.

Optionally, the device can comprise means relating to the characteristics of the process that was described above and, in particular, information technology objects for instantiation of the classes defining the predefined media motifs and elementary components comprising them.

The invention likewise relates to a computer program that can be read by a microprocessor, comprising portions of software code adapted to implementing a process according to the invention, when it is loaded and executed by the microprocessor.

The computer program has characteristics and advantages that are analogous to the process that it implements.

BRIEF DESCRIPTION OF THE FIGURES

Other features and advantages of the invention will become apparent again in the following description, illustrated by the attached drawings, in which:
FIG. 5 shows an example of the XML fragment corresponding to the definition of a video motif.

DETAILED EMBODIMENTS

Figure 1:
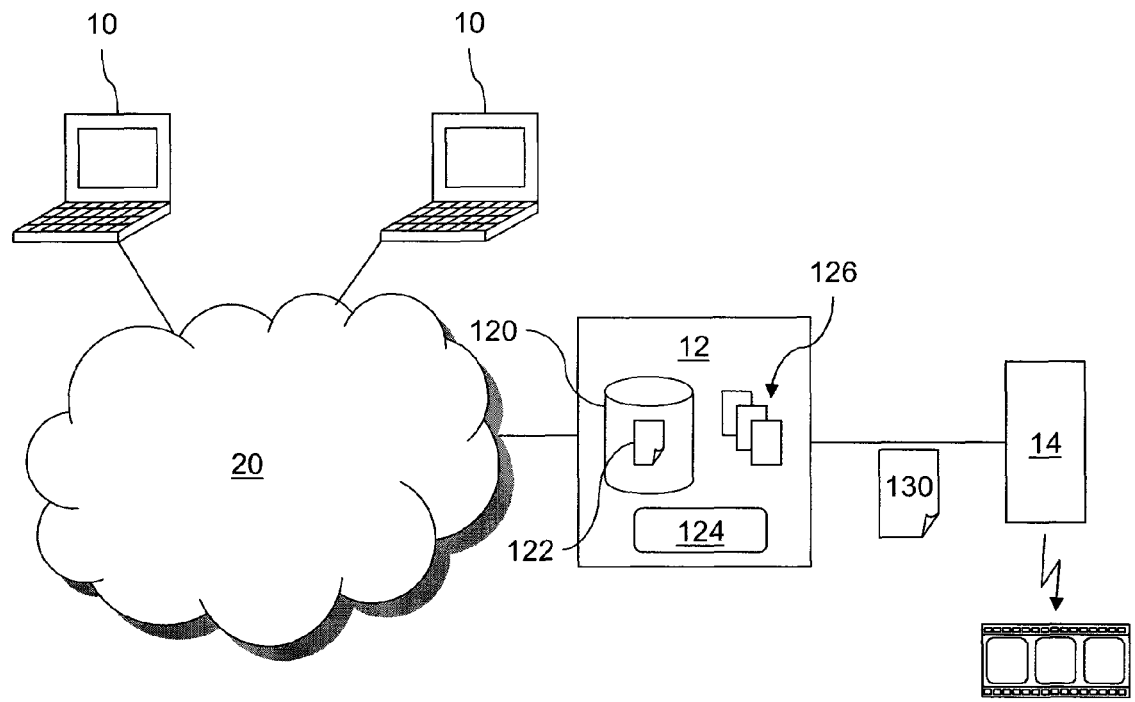
FIG. 1 shows one example of a system for implementing the invention.

With reference to FIG. 1, one example of the system for implementing the invention comprises a plurality of user terminals 10 and a processing server 12 that are connected to a communication network 20. Preferably, the invention is implemented via Web applications, in which case the network 20 is the Internet, the terminals are devices (computers, telephones, etc.) that can connect to the Internet, and the processing server 12 is a web server. For this reason, the terminals 10 are of the conventional type and will not be presented in more detail.

The processing server 12 is, moreover, connected by a dedicated line to a video editing server 14, for example a server loading Stupeflix technology whose description is given at the address wiki.stupeflix.com. This Stupeflix server has an API interface allowing a definition file 130 of a video (or film) sequence to be furnished to it in such a way as to generate the corresponding video film 140. The definition file is especially in XML format and describes the video sequence to be generated based on markers, called "atoms," such as <image>, <video>, <audio>, <effect>, <filter>, <transition>, <sequence>, <stack>, etc. These different markers that are defined at the aforementioned address are not presented in more detail.

For example, the following XML fragment corresponds to a rotational effect between three consecutive images over 5 seconds:

```
<effect type="rotator" duration="5.0" timeOffset="0.0" >
    <image filename="http://www.stupeflix.com/images/image1.jpg"/>
    <image filename="http://www.stupeflix.com/images/image2.jpg"/>
    <image filename="http://www.stupeflix.com/images/image3.jpg"/>
</effect>
```

As a variant, the editing server 14 can be an integral part of the processing server 12, i.e., it can be accessible by the server 12 via the Internet network 20.

The web server 12 proposes especially a digital data web storage service linked to a database 120, service that the users 10 access (via a web navigator) for storing their memories, i.e., media files 122 in digital form such as videos, image files, audio files or else text files. The web storage service likewise proposes an option for creating and generating a video sequence based on all or part of the memories stored by the user.

The user can thus initiate processing for creating such a video sequence by processing software means 124.

Figure 2:
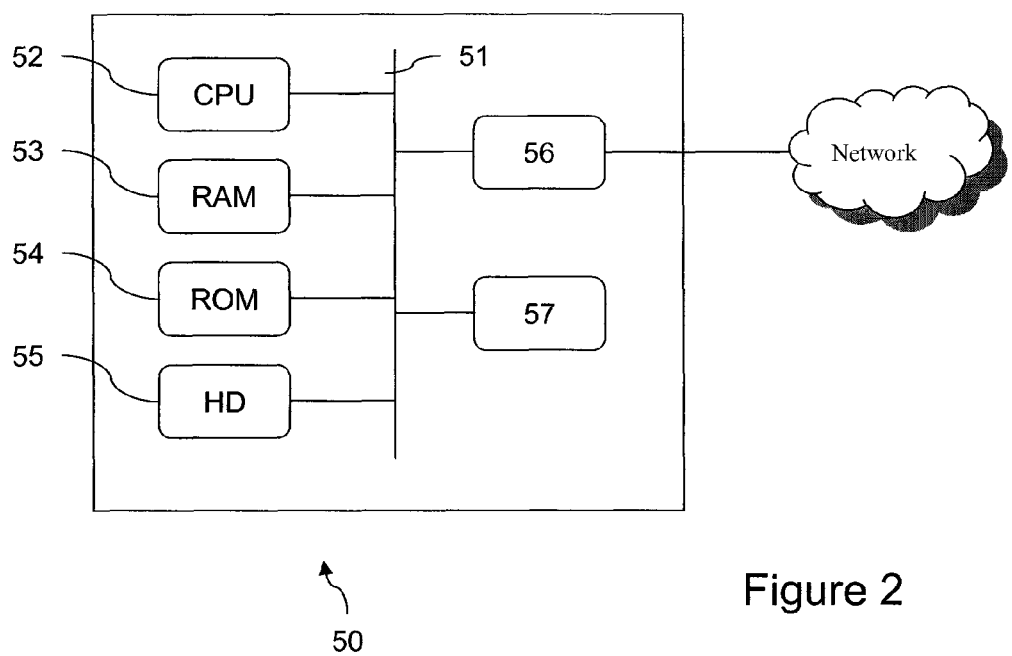
FIG. 2 shows a particular hardware configuration of a device that is able to implement the process according to the invention.

FIG. 2 schematically shows a system 50 for implementing the invention, especially the processing server 12 and/or the video editing server 14.

The system 50 comprises a communication bus 51 to which the following are connected: a central processing unit or "microprocessor" 52, a random access memory 53, a read-only memory ROM 54, a hard disk 55, a communication interface 56 with a network, and possibly other peripherals 57 (display and marking device for an administrator, disk or diskette reader, etc.).

The read-only memory 54, preferably programmable by the user, comprises the programs whose execution allows implementation of the process according to the invention, i.e., the pages of the Internet site offering the service for creation of a video sequence and software codes (or applications) for implementation of processing in view of this creation, i.e., of the generation of the video editing.

During their execution, the executable code of the programs is loaded into the random access memory 53, RAM type, and executed by the microprocessor 52. This execution allows for the creation of a video sequence 140 as described below, as well as execution of the requested web service (providing the corresponding web pages).

The hard disk 55 or any other programmable read-only memory comprises the database 120 in which the different users of the web service store their memories.

The communication interface 56 is preferably of the network interface type supporting the IP protocol.

The system described here, and especially the central unit 52, are able to implement all or part of the processing described below in conjunction with FIGS. 3 to 10, for implementing the processes that are objects of this invention and constituting the systems that are the objects of this invention.

Figures 3, 4:
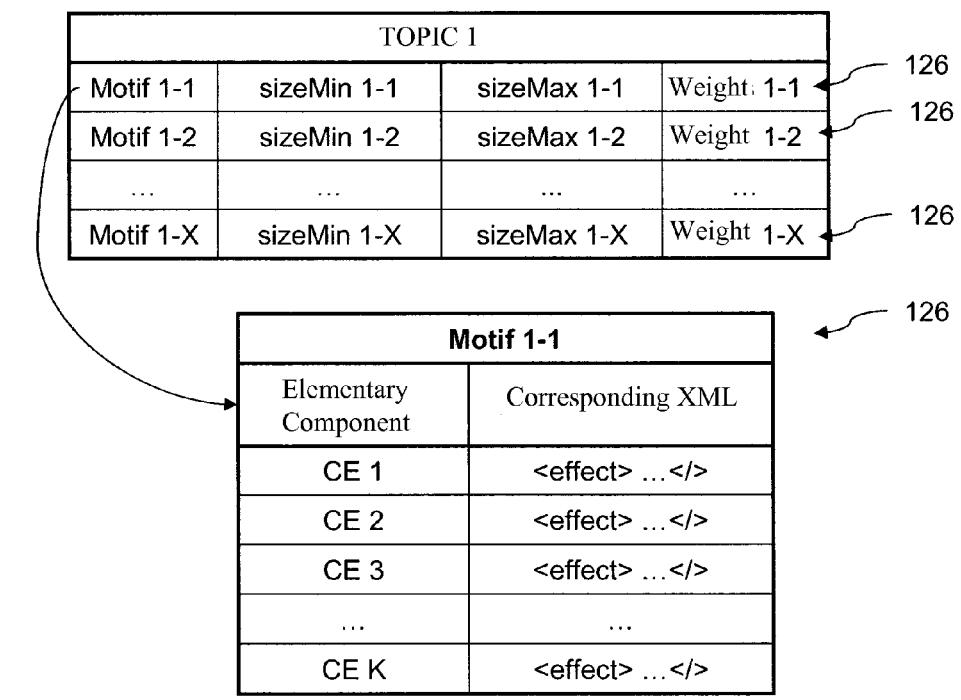
FIG. 3 illustrates an example of a media file database used by this invention.
FIG. 4 illustrates a video motif library for the invention.

FIG. 3 illustrates, in the form of a table, the contents of the database 120 for a given user. For each media file 122, there is a file name (column C1), a URL location of the media file in the base (C2), and a set of media file description data (C3).

In the example of the figure, the user has N media files.

The description data can be inherent in the contents of the media file (C3.1) or can be metadata that have been added, for example, by the user (C3.2).

The description data inherent in the media file, or "media data," can be indicated in the file by the hardware that has created it or can be related after analysis. This analysis can be pursued by the processing means 124, either periodically or during operations of creating a video sequence by the user.

By way of example, the media data can comprise the following:

For photos or images: the size of the photo, the dominant color, the position of the face or faces after detection thereof;

For audio: the type of sound (music, speech), a transcription of words into text, a rhythm or "tempo" (beats per minute or BPM);

For videos: the same data as for the photos/images and the audio, and, moreover, the length of the film, the flow or bit rate, a text (the text appearing in the video or a retranscription of "spoken" portions of the audio band) and possibly keywords.

The metadata, regardless of the type of media file (audio, image, film), are, for example, geolocation data, dating (date and time), labels/keywords or tags, a note/score value from which it will be possible to identify priority or "key" media files, comments in the form of text, statistics of, for example, display or editing, photos, identification of the device or the type of capture device used, etc.

For implementing the invention, the processing server 12, moreover, comprises a plurality of video motifs 126 or templates or patterns according to English terminology. These video motifs are stored in the form of digital files within digital topic libraries as described below.

The idea of "motif" is largely known to one skilled in the art and for a video application essentially encompasses a spatiotemporal model or definition of visual rendering for one or more media files that it remains to determine. For this reason, the video motifs comprise imaginary locations or placeholders at the level of which the media files to be displayed with the corresponding visual rendering will be identified, for example using their URL.

The video motifs are interchangeable independent units that can thus be organized in various ways to provide a composition of visual renderings corresponding to the definition of the video sequence to be generated. According to the invention, this composition is generated randomly based on the memories of the user, as will be seen below.

Moreover, the composition can cause transitions (in the sense of Stupeflix, for example) between two successive motifs for easing the visual changes between two consecutively displayed media files.

Within the framework of this invention, each selected video motif 126 defines the visual rendering that will be applied to a plurality of media files: it thus contains at least one model elementary component that will be applied to the set of this plurality of media files in the form of a plurality of Stupeflix atoms.

These video motifs are predefined by, for example, a video designer, by means of the aforementioned Stupeflix markers. They are then stored in the form of one or more XML files.

In particular, several video motif libraries can be provided, each corresponding to a particular topic proposed to the user, for example "Emotion," "Dynamic" and "Profusion." The video motifs of each topic have been predefined to provide visual renderings in conjunction with the corresponding topic by playing with, for example, the effects or the transitions that have been provided by the Stupeflix engine.

In one embodiment, each library takes the form of a single XML file that describes each of the video motifs that it contains, separating them by a <motif> marker, for example.

Similarly, a library of possible transitions between two video motifs is provided.

FIG. 4 schematically illustrates, in the form of tables, the contents of an XML file defining the video motifs 126 for a topic THEME 1.

A video motif 126 is defined generally by a name "Motif 1-1," a minimum size of use "sizeMIN 1-1," a maximum size of use "sizeMAX 1-1," and weighting "poids [weight] 1-1."

Moreover, each motif 126 is composed of one or more model elementary components "CE" (first column) corresponding to XML Stupeflix markers (second column) possibly provided with an imaginary location for receiving a media file.

The minimum and maximum sizes of use define a range (possibly discontinuous) of media file numbers that can be integrated into the corresponding video motif by initiating, if necessary, the duplication or repetition of model elementary components for several media files to be integrated. The variable size of the video motif is thus adjusted as a function of the number of duplicated elementary components. This variable size reflects the number of imaginary positions that have been authorized for the use of this motif. Of course, these two sizes are different since one elementary component having an imaginary location can be repeated.

This repetition capacity especially makes it possible to reduce the number of video motifs allowing the description of media files, regardless of their number.

FIG. 5 shows one example of an XML extract for a video motif 126. This example corresponds to visual rendering beginning by a central stack superimposing a foreground designed to receive a first media file (lines 2 to 10) on a background designed to receive a photo (lines 12 to 19), and then a video (lines 20 to 24), a crossfade transition between this photo and this video of the background being provided (lines 26-28).

The visual rendering continues with an output sequence ("outro"—lines 31 to 35) after a visual transition of crossfade type (line 30).

In this example, at the lowest hierarchical levels, there are the Stupeflix markers, here <effect>, <image>, <filter> (lines 4 to 8 for example), the <image> marker comprising especially the imaginary location "filename=" "" designed to receive the indication of a media file.

This preservation of Stupeflix markers at the lowest hierarchical levels allows simplification of possible test operations of the video motifs that have been defined in this way.

The markers of the highest hierarchical level, especially <central>, <front>, <display>, <link> and <outro>, are defined below, to allow effective implementation of the invention, especially during operations for generating the XML file to be provided to the API Stupeflix of the server 14.

These are XML files defining the libraries that are loaded generally into the random access memory 53 by the video sequence creation application. This loading can be done for each request for creating a video sequence by a user; this allows a reduction of the memory occupied by this loading in the absence of demand. As a variant, however, this loading can be done a single time at the initiation of the creation application; this allows a reduction of the load in loading when many requests follow one another.

In one embodiment, the creation application is object-oriented in such a way that the loading of the video motifs 126 is done in the form of object creation corresponding to XML markers as follows.

The operation of conversion of the XML files into objects consists in decentralizing these files. By way of example, it can be a matter of a manual deserialization consisting in syntactically analyzing (or parsing) the XML file for manually constructing each of the objects found. This manual approach offers total control and is implemented via a deserialization method, called fromXML( ), provided in the object classes as defined below.

As a variant, a library of external methods of automatic deserialization can be used.

Of course, mechanisms other than the objects can be used for manipulating video motifs 126 and creating the video sequence. For example, the XML fragments can be directly manipulated.

Figure 6:
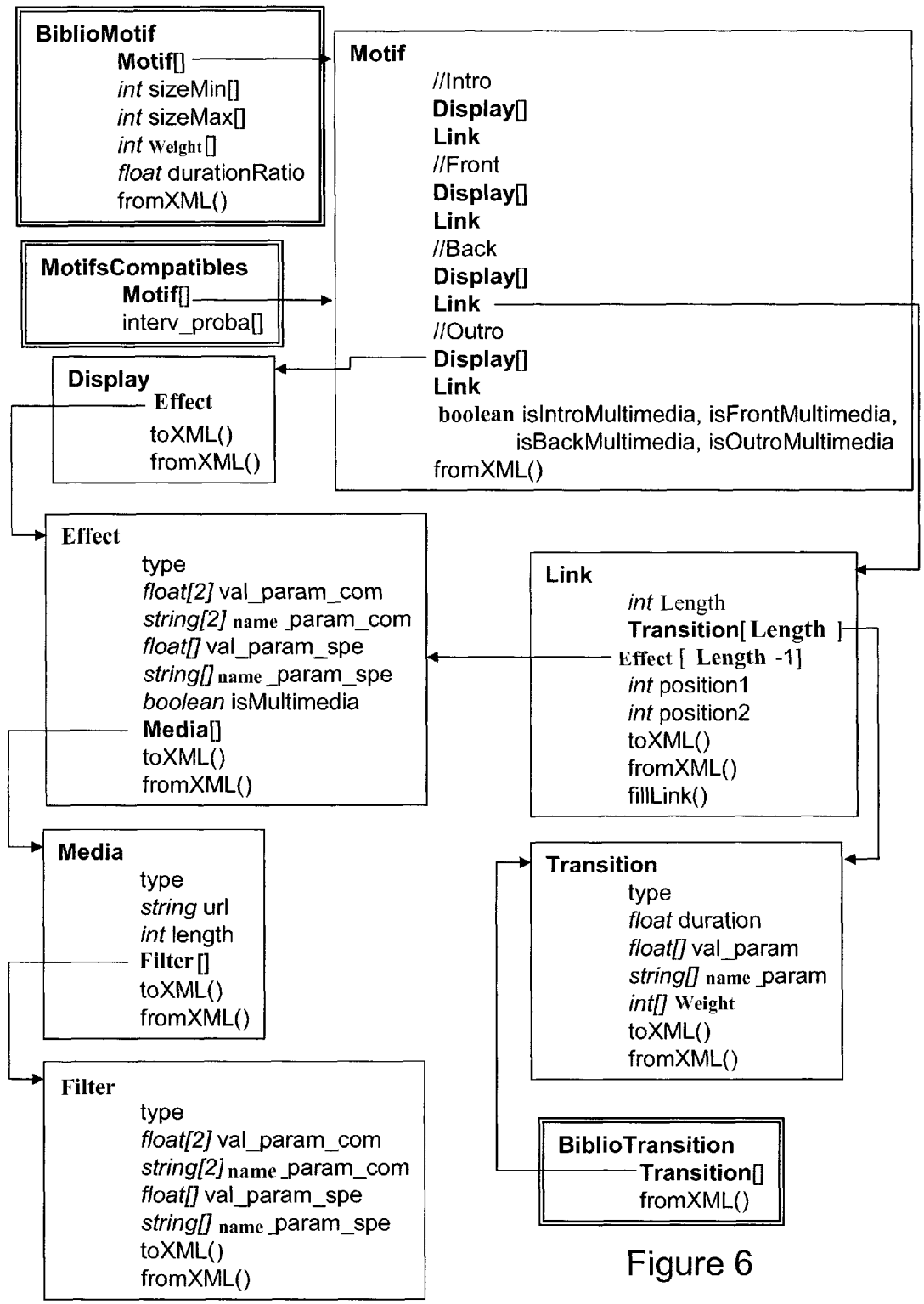
FIG. 6 schematically illustrates several classes of object-oriented programming for showing the video motifs.

FIG. 6 illustrates different object classes (boldfaced in the figure) that are implemented for loading the video motifs and the transitions between video motifs.

One general class BiblioMotif regroups the set of motifs Motif[ ] of a topical library (and thus of the same XML definition file) and specifies a duration coefficient durationRatio that is applicable to the set of motifs of this topic, this coefficient allowing modulation of the durations by default that are attributed to the elementary components of the motifs, to make, for example, a library of accelerated motifs (reflecting the "dynamic" topic).

This general class defines, for each motif Motif[i], a minimum size sizeMin[i], a maximum size sizeMax[i] (as defined above) and a weight poids[i]. Moreover, the method fromXML( ) is associated with this class to allow deserialization of the XML definition files of video motif libraries.

The Motif subclass comprises for itself a definition of a video motif in model elementary components of visual rendering having imaginary locations for specifying the media files to be displayed there, as described below. These model elementary components are the Display objects here corresponding essentially to the <effect> elements of Stupeflix.

The video motif gives a complete definition of a video sequence portion, except for the URLs of the media files to be displayed as well as its size that can vary as a function of the repetition of certain model elementary components.

For purposes of illustration, a motif of the introduction sequence (in a temporal sense) form is chosen, a central part composed of a stack of two sequences, then an output sequence, these three portions being linked by two transitions to make the concatenation fluid.

A stack consists in stacking (with a visual rendering of the foreground toward the background) several visual elements. Conversely, a sequence is a succession of visual elements over time.

In the example of FIG. 5 that does not comprise any introduction, the central stack is identified by the marker <central> (a first sequence <front> and a second sequence <back>) and the output sequence by the <outro> marker.

Generally, for this sequence (intro, front, back, outro), it is thus provided that the motif defines one or more model elementary components corresponding to one or more respective criteria relative to media files. Thus, when a media file is to be processed, the model elementary component that corresponds to said criteria relative to the media file will be chosen.

For reasons of simplification of illustration, the focus below will be on visual media files alone, i.e., of the image/photo or video type. Thus, it is provided that the sequences comprise an immaterial model elementary component Display of the media file type or two model elementary components Display dedicated to media files of the image/photo and video types respectively.

Thus, the sequences of the video motif of our example comprise at most two elementary components and one transition between them.

For our example, the Motif subclass is defined by, successively, one table of at most two elementary components Display[ ] and one link Link for each of the sequences (in order, the introduction, the foreground of the central stack, the background of the central stack, and the final sequence).

Moreover, it comprises the Boolean isIntroMultimedia, isFrontMultimedia, isBackMultimedia and isOutroMultimedia provided to indicate if each of the corresponding sequences (Intro, Front, Back, Outro) comprises the multimedia Display[s] [plural] (Boolean true) or not (Boolean false). "Multimedia Display" is defined as the fact that this element defines a visual rendering displaying several media files at the same time. This corresponds to, for example, a Stupeflix <effect> in which several images are indicated. These Booleans make it possible to promptly know if several images can be assigned to the same Display element without having to delve into the subelements comprising this element. This avoids useless processing.

Finally, this subclass is associated with the fromXML( ) deserialization method similar to the one described above, a method that is recursively called from object into object, here by the BiblioMotif.fromXML( ) method.

As follows from the example of FIG. 5, especially the Display subclass comprises solely an Effet [Effect] object corresponding to the Stupeflix <effect> marker provided for displaying one or more media fields that will be indicated there. Moreover, two methods are associated with it, one for deserialization fromXML( ) that has already been defined (and recursively called by Media.fromXML( )) and the other for serialization toXML( ) provided for generating an XML file for definition of the video sequence to be created, as will be seen below.

Likewise, the link class Link comprises simply one Transition object corresponding to the Stupeflix <transition> marker as well as the two methods fromXML( ) and toXML( ).

In an improved version, the Link links provided to link two elementary Display components can integrate Effet objects in order to generate a more complex rendering of the transition between the two elementary display components. In this case, the Link object is a transition-(effect-transition)*length sequence in the sense of the Stupeflix <effect> and <transition>.

The Link object likewise specifies, via parameters position1 and position2, the lists of the indices of the effects of the Link in which the media files of the respectively preceding and following elementary components will be integrated. In particular, these lists can be limited to a single media file. The two methods fromXML( ) and toXML( ) are, moreover, attached to this Link class.

The transitions are largely defined in the aforementioned Stupeflix specification. It will be noted that they generally have a "type" parameter, a duration "duration" and complementary parameters as a function of the types (for example, a "direction," an "angle," etc.). In the Transition class that is defined for the implementation of the invention, these complementary parameters are stored in the tables val_param[ ] and nom_param[ ] [nom=name] (the values and the names taken by these parameters respectively). The two methods fromXML( ) and toXML( ) are, moreover, attached to this Transition class.

Similarly, the Effet class takes the different parameters provided by Stupeflix for the <effect> marker (the 2 common parameters [param_com] "duration" and "timeOffset," and the specific parameters, for example "direction," "adapter," etc.) and adds a Boolean IsMultimedia to indicate if the defined effect is applied to one (Boolean false—mono-media) or several media files (Boolean true—multimedia) shown in the table of objects Media[ ].

Since it is difficult to predict the size of the list of media files of an effect (before knowing to which event it will be applied) during loading of the XML files of libraries of video motifs 126, a list will be used of a single Media element at this stage using one empty URL (actual location intended to receive the media file address to which the visual rendering effect will be applied), which will be extended, if necessary, by cloning this Media element several times during construction of the film.

However, if it is desired to define an effect with several media files having different local processing (using the Stupeflix <filter>) in the video motif, it can be initially provided that the Media[ ] table comprises as many Media elements as local different processing is desired.

The Media object used here mutualizes the different markers of media files provided by Stupeflix (for example <image>, <video>, <audio>, <text>), adding a type field for specifying this difference there. The other parameters are conventional, and especially the Filtre [Filter] object that is likewise defined by Stupeflix.

The two methods fromXML( ) and toXML( ) are, moreover, attached to these three classes Effet, Media and Filtre.

It should be remarked that as defined by Stupeflix, the <effect> effects correspond to spatial processing of the corresponding media files (movement, 3D effect, zoom, etc.), whereas the <filter> filters correspond to a rendering effect within the media file of the visual type (for example, processing of pixels: fuzziness, color, crop, frame, etc.).

Thus, always according to Stupeflix, an <effect> element, encapsulating one or more media encapsulating filters themselves, is a building block for creating a film, hence the terminology of elementary component adopted above for naming the Display [plural] (equivalent to Effet].

Symmetrically to the library of video motifs 126, a BiblioTransition class is created for defining the library of transitions used for linking the video motifs between one another in the composition of the video sequence under construction.

Figure 7:
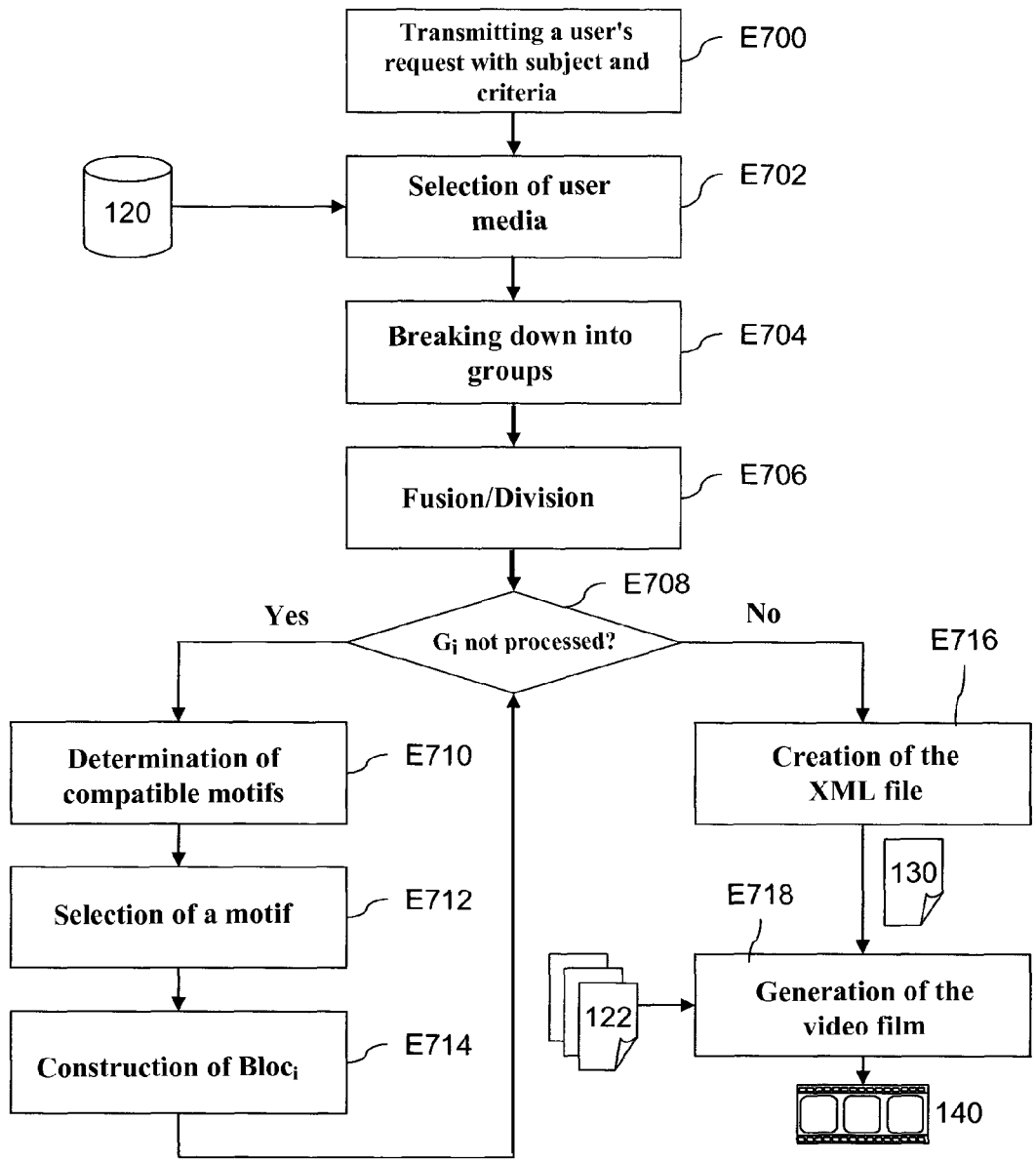
FIG. 7 shows the stages of a process according to the invention in the form of a flow chart.

Having loaded the set of predefined video motifs 126 into the memory, the process for creating a video sequence according to the invention can now be described with reference to FIG. 7.

The first stage E700 for the user consists in transmitting a request for creation of such a video sequence. This request can be especially generated via a web navigator by which the user 10 accesses the service for creating a video film proposed by the server 12.

In the web navigator interface, the user can especially indicate a preferred topic, for example "Dynamic," as well as criteria of selection among the media files of which it uses, for example, the criteria "tag-Sicily" and "date=2009." The request, http type, containing the topic and the selection criteria, is received by the server 12; this initiates execution of this application for creation of a video sequence.

Figure 8:
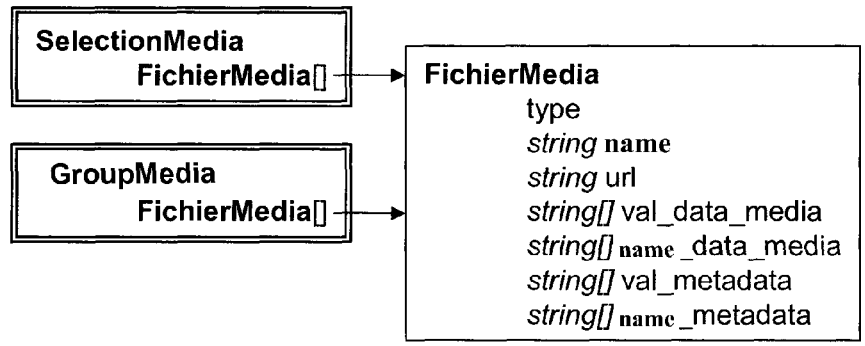
FIG. 8 schematically illustrates classes of object-oriented programming for representing the media files.

Upon receipt of the request, the server 12 accesses the base 120 and initiates the selection of media files 122 chosen by the user using the selection criteria specified in the request (stage E702). The files obtained are stored using computer objects resting on a SelectionMedia class and a Fichier[File]Media class such as illustrated in FIG. 8. These classes allow storage of media data (data_media from the column C3.1—FIG. 3) and metadata (metadata from the column C3.2). By anticipation and to economize on the use of the random access memory of the server 12, only the media data and metadata that are useful for the processing sequence, for example the keywords (tags) and the dating of the media files 122, will be stored.

Based on the selection of media files 122 for the user, the processing at stage E704 consists in breaking down this selection into groups $G_i$ of media files that have increased coherence within the same group.

This determination of the degree of coherence is performed as a function of at least one coherence criterion, by analysis of media files, for example based on media data and metadata. This analysis can, moreover, allow positioning of the different media files relative to one another and thus their arrangement in order (according to a primary criterion, for example).

By way of illustration such as described above, coherence criteria can be considered, such as dates of the media files (time regrouping) and associated keywords (semantic regrouping) to implement a regrouping of the media. As a variant or in combination, it is possible to take into account other (meta)data such as, for example, the topics color, the geolocation, the presence of faces, etc.

It should be noted that during this analysis, certain threshold values can be defined to eliminate certain media files from the selection that are of little relevance. These threshold values can, for example, follow from the topic chosen by the user (a topic of the "portrait" type can eliminate all of the media files without faces), be defined relative to the set of media files of the selection (eliminate an intruder in view of certain primary criteria), or depend on certain types of media files that have not been paid for.

Especially for the remainder, only the media files of the visual, video and photo/image type will be considered for generating the video sequence. Thus, the media files of the audio or text type are eliminated during this stage.

In our illustrative example, a group $G_i$ consists of a sequence, covering a time interval that is less than a first threshold value S1 (for example 24 hours, adaptable parameter), of media files 122, of which each time lag with the preceding file is less than a second threshold value S2 (for example 30 minutes, parameter likewise adaptable) and of which the proximity of the keywords (if there are enough) is fairly high.

A first group $G_1$ is initialized with the first media $M_1$ in chronological order.

$M_j$ is each media file 122 taken in chronological order, $M_{Gi}$ is the first media file of group $G_i$ (first in time), $\delta t(M_j, M_k)$ is the time difference between $M_j$ and $M_k$, $Ntag(M_j)$ is the number of tags of the file $M_j$, and $NCtag(M_j, M_k)$ is the number of tags in common between $M_j$ and $M_k$. Then, the following regrouping operations are carried out, for successively each media file $M_j$, with $G_i$ the current group as follows:

---

If $\delta t(M_j, M_{Gi})$ < S1, then
   If $\delta t(M_{j-1}, M_j)$ < S2, then
     If $NCtag(M_{j-1}) \geq 3$ and $Ntag(M_j) \geq 3$, then
       If $NCtag(M_{j-i}, M_j) > 1/2 * \min\{Ntag(M_{j-i}); Ntag(M_j)\}$,
       then
          $M_j$ belongs to group $G_i$ (note that other values can be used to compare with the common number NC of tags)
          If not, $M_j$ belongs to a new current group $G_{i+1}$, and $G_i$ is closed
       If not $M_j$ belongs to the group $G_i$
     If not $M_j$ belongs to a new current group $G_{i+1}$, and $G_i$ is closed
If not $M_j$ belongs to a new current group $G_{i+1}$, and $G_i$ is closed
End

---

At the end of stage E704, there is thus a set of groups $G_i$ sharing the set of media files 122 selected in their chronological order.

To store these groups, one GroupeMedia class can be used as illustrated in FIG. 8. One group $G_i$ corresponds to each instantiation of a GroupeMedia object.

Once the media files 122 are regrouped and put in order, the invention calls for applying video processing of the visual rendering that is chosen randomly and is thus different for each group. By applying the same processing of the rendering for the media files of the same groups, the visual coherence of the media groups is preserved.

First, the optional stage E706 can be implemented to make the group sizes uniform in order to make the visual rendering more regular or to diversify it, should this be the case, but likewise to allow use of a more limited number of video motifs 126 for editing the video sequence.

This stage E706 can first of all comprise a substage for regrouping orphan groups $G_i$ (comprising a single media file). This regrouping is done for adjacent groups $G_i$ and for a maximum of 5 groups.

For example, if there is a series of groups containing 2, 1, 1, 1, 3 and 2 media files respectively, the groups with the following distribution are obtained after fusion: 2, 3, 3 and 2.

Conversely, the distribution 2, 1, 2, 1, 3 and then 2 remains unchanged, whereas the distribution 2, 1, 1, 1, 1, 1, 1, 1 and then 2 yields 2, 5, 2 and 2.

This stage E706 can likewise comprise a substage for subdivision or fragmentation of the groups $G_i$ that have too large a number of media files, for example starting from 10 media files.

Thus, for a distribution of 12, 2, 4 and then 3, the following are obtained after subdivision: 10, 2, 2, 4 and 3.

The next topic is the creation of the video sequence by successively processing each group $G_i$ that has been constructed in this way (test E708).

During the processing of the first group $G_1$, the video sequence is initialized by instantiation of a Film object based on the class of the same name (FIG. 9), indicating likewise:

A title, either specified by the user during the request, or formed based on the keywords entered by the user in his request ("Sicily 2009," for example);

The size of the table of Bloc elements corresponding to the number of groups $G_i$. Actually, as will become apparent below, the Bloc element is the implementation of a video motif Motif for a group "Implementation" here means that the actual locations are then entered by indication of the locations of different media files of the group. The Bloc implementation thus entirely defines the visual rendering of a group of media files;

The size of the Transition table that is the size of the Bloc table reduced by 1;

An Audio object corresponding to an audio track (mp3 for example) by default or that the user has indicated.

It should be noted that during the composition of the video sequence, it starts by opening a stack (time superposition of several elements, here audio and visual) in which first the Audio element is placed, second the main sequence of the film (time succession of visual renderings of the groups $G_i$), which starts by the title on full screen on a black background followed by a transition of the crossfade type, for example toward the first Bloc corresponding to the first group $G_1$. During the "closing of the film," there is thus reclosing of the main sequence, and then the stack that has been opened for the Audio element.

The Audio element comprises especially optional parameters such as duration, fadein, fadeout, skip, margin-start, margin-end, margin-both or volume (1.0 by default).

The construction of the Bloc of visual rendering of a group $G_i$ then comprises a first stage E710 for determination of the motifs of the chosen topical library (in our example, the topic "Dynamic") that are compatible with the current $G_i$ group. This compatibility can take into account various parameters, for example the size $NG_i$ of the group $G_i$ (number of media files 122 that are included there) compared to sizes sizeMin and sizeMax of each of the video motifs 126 of the chosen library.

In performing this comparison, it is verified that the variable size of the video motifs (the range of numbers of media files of which these video motifs can define the visual rendering) includes the size of the group $G_i$, and thus it is ensured that the retained video motifs each allow display of the set of media files comprising the current group $G_i$. Thus, the set of compatible motifs, stored by a MotifsCompatibles object, is obtained (FIG. 6).

Then, in stage E712, random selection is initiated for the current group $G_i$, of a compatible video motif, possibly taking into account a probability distribution associated with the set of compatible motifs (as a function of the weighting "poids" [weight] associated with each video motif).

This weighting can be defined by the designer of the video motifs in order to promote certain ones among them for the visual renderings.

For example, having pairs (Motif 1=A, poids 1=1), (Motif 2=B, poids 2=2) and (Motif 3=C, poids 3=3), a random value $\lambda$ between 0 and 1, let us say $\lambda$=0.53, can be taken.

First, the scores S between 0 and 1 are calculated for each of the motifs based on weightings, i.e.:

For the motif A, the score $S_A$=1/(1+2+3)=⅙;
For the motif B, the score $S_B$=2/(1+2+3)=⅓; and
For the motif C, the score $S_C$=3/(1+2+3)=½.

The motif A is selected for any random value in [0; ⅙[, the motif B for any random value in [⅙; ½[ and the motif C for any random value in [½; 1]. These probability intervals ("interv_proba") are stored especially in the MotifsCompatibles objects (FIG. 6) as soon as they are calculated in order to allow their use in an easy manner.

Returning to our example, the motif C is thus selected because $\lambda$=0.53.

Starting from this selected video motif, the next step is then the construction of the corresponding Bloc element, called $Bloc_i$, for the group $G_i$ during the stage E714.

In the example of the video motifs retained above, a block $Bloc_i$ is composed of one introduction sequence, one central stack of two sequences, and one output sequence, these three parts being linked by two transitions.

Figure 10:
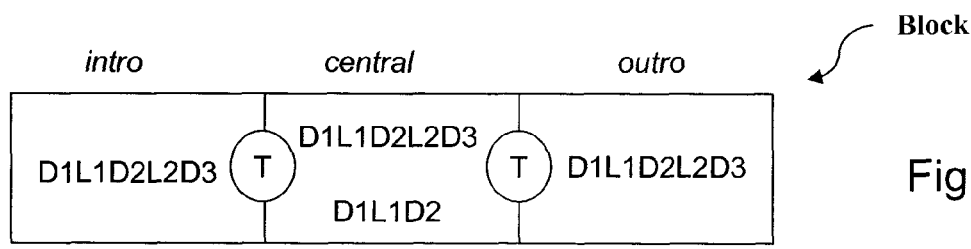
FIG. 10 illustrates one example of the structure of the video motif.

FIG. 10 schematically illustrates the composition of such a Bloc defining the visual rendering of one group $G_i$, with Di the Display [plural], Li the Link [plural] comprising the sequences, and T the transitions.

Figure 9:
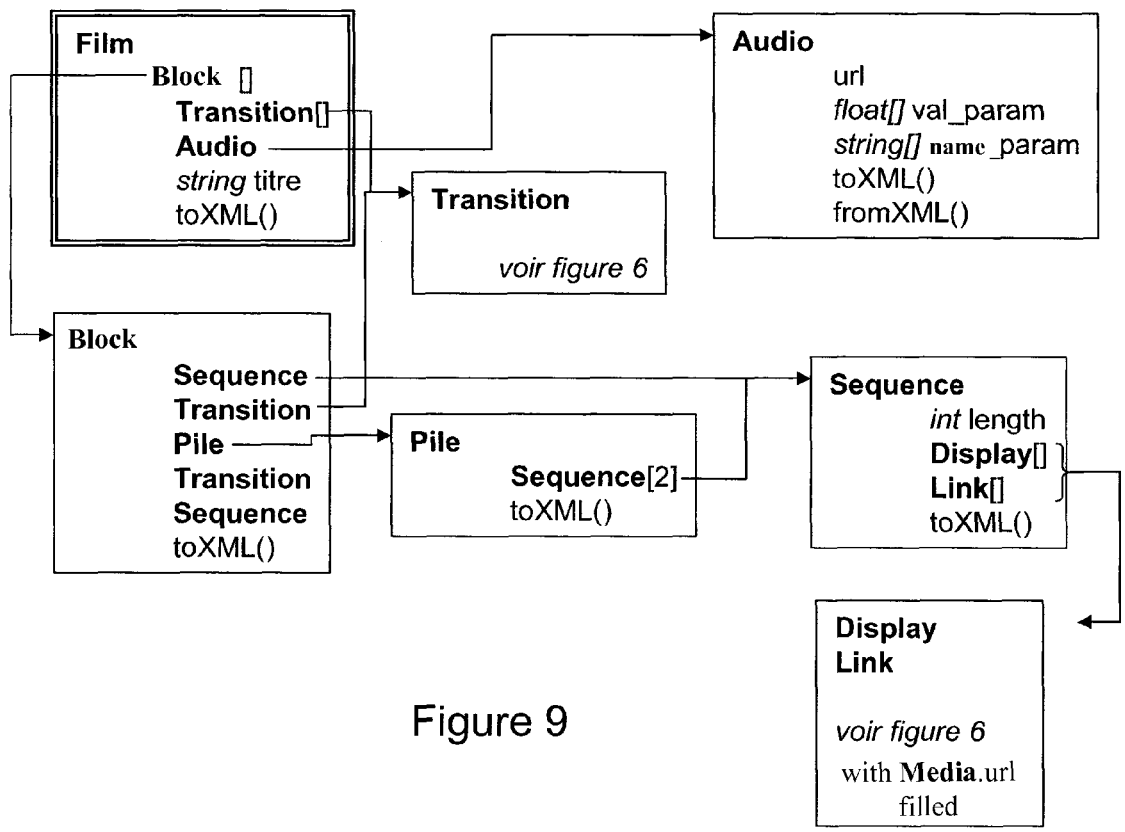
FIG. 9 schematically illustrates several classes of object-oriented programming for showing a video film under construction.

The choice of two transitions T can be made randomly based on a probability distribution that is associated with the set of transitions (similarly to the selection E712 of the video motif). Their identifiers are then entered in the $Bloc_i$ object that has been created (FIG. 9).

Then, each of the introduction sequences, of the central stack and of the output, is constructed in succession, storing them using the Sequence and Pile objects. The sequences are then aimed at the Display and Link objects defined for the sequences corresponding to the level of the selected video motif, into which the URLs of the media files of the group $G_i$ are incorporated.

Different strategies for incorporation of media files into these sequences can be envisioned, such as, for example, chronological incorporation into the introduction sequence, and then the foreground sequence of the central stack, and then the background sequences of the central stack, and finally the output sequence.

As a variant, certain media files that are considered "key" can be introduced on a priority basis into the introduction sequence. In particular, this "key" property can be specified by the user 10 in one of the metadata that are associated with the files 122, for example in the form of a score (FIG. 3). In this case, an identification of the file or of the two key media files of the group $G_i$ with the best scores is done in such a way that they are taken as "key" media and introduced at the start of $Bloc_i$.

Also as a variant, instead of filling the video motifs using the media files taken in chronological order (possibly with identification of key media), an anti-chronological order or a criterion of sorting other than the time criterion can be used.

Taking into account our example of the sequences Intro, Front, Back, and Outro, the construction of the block $Bloc_i$ based on media files $M_j$ can consist in the following operations, for each sequence in succession:

```
IF Motif.X.Display (with X = Intro, Front, Back and Outro according to the sequence under
    consideration) is of size 1, this indicates that the Display list in the selected video
    motif for the sequence under consideration is composed of a single model
    elementary component that is thus applied indiscriminately to media files of the
    image type and of the video type, then
  If isXMultimedia = true (case in which the effects are multimedia, in other words all
    the media files will be in the same display element Display), then
      Sequence.Display is of size 1
      Sequence.Link is of size 0
      Sequence.Display receives a copy of Motif.X.Display
      Sequence.Display.Effet.duration = Sequence.Display.Effet. duration * NG_i
        *
        BiblioMotif.durationRatio (allowing adjustment of the duration of
        the effect for taking into account the number of media [plural] to be
        displayed and of the topic chosen by the user)
      Dimension Sequence.Display.Effet.Media[ ] as a function of the number
NG_i of
        media files to be introduced into the effect.
      Each Sequence.Display.Effet.Media.url receives the URL of the
corresponding
        media file M_j, as a function of the chosen incorporation strategy
  If not, if isXMultimedia = false (thus, the mono-media Effet [plural] are provided)
      Sequence.Display is of size NG_i
      Each Sequence.Display receives a copy of the Motif.X.Display
      Each Sequence.Display.Effet.duration =
        Sequence.Display.Effet.duration * BiblioMotif.durationRatio
        (allowing modulation of the duration of display of the media
        according to the topic chosen by the user)
      Each Sequence.Display.Effet.Media.url receives the URL of the
corresponding
```

```
            media file M_j, as a function of the chosen incorporation strategy
        If Motif.X.Link is not empty (there is thus a defined link in the video motif)
            Sequence.Link is of size NG_i − 1
            Each Sequence.Link receives a copy of Motif.X.Link
            For each Sequence.Link, an object method is called Link.fillLink,
with, as
                    parameters, the Media preceding this link and the Media
                    following this link
If not, if Motif.X.Display is of size 2 (the list of Display [plural] is composed of two model
elements, for example the first for photos/images, and the second for videos - in this case,
the effects are, for example, solely monomedia for simplifying the explanations)
        Sequence.Display is of size NG_i
        Each Sequence.Display receives a copy of the Motif.X.Display,
        For each Sequence.Display for which the media file M_j is intended,
            If M_j is of the photo/image type (type that can be determined based on file
                extensions), Sequence.Display receives a copy of
                Motif.X.Display[1]
            If M_j is of the video type, Sequence.Display receives a copy of
Motif.X.Display[2]
        Each Sequence.Display.Effet.duration =
            Sequence.Display.Effet.duration *
            BiblioMotif.durationRatio
            Sequence.Display.Effet.Media.url receives the URL of M_j
        If Motif.X.Link is not empty
            Sequence.Link is of size NG_i − 1
            Each Sequence.Link receives a copy of Motif.X.Link
            For each Sequence.Link, the object method is called Link.fillLink
with, as
                    parameters, the Media preceding this link and the Media
                    following this link
End
```

It is apparent here that in the presence of mono-media effects, the model Display or the two model Display [plural] defined in the Motif selected to adjust the implementation of this motif (i.e., the block Bloc) to the size of the current $G_i$ group is/are duplicated or repeated. Thus, each media file 122 of the group $G_i$—in the constructed block $Bloc_i$—has an elementary component Display provided for its display.

It should be noted that the fillLink method for a given Link can be implemented as follows:

```
fillLink (media precedent [preceding media], media suivant [following
media])
    {
    If Link.position1 !=zero (i.e., not empty)
        Link.Effet[position1].Media.url = media precedent
        [preceding media].url
    If Link.position2 !=zero
        Link.Effet[position2].Media.url = media suivant
        [following media].url
}
```

Once all of the blocks $Bloc_i$, have been constructed, the definition of the film is finished.

At the end of the iterations of the stage E714, there is thus in the memory a description of the video sequence through the objects Film, Audio, Bloc, Pile [Stack], Sequence, Display, Effet, Media, Filtre, Link and Transition.

These different classes all comprise the method toXML( ) of which the function is to convert the information relative to these objects into portions that are XML-compatible with the generation server 14, in our example the Stupeflix engine. The stage E716 thus consists in this conversion, likewise called serialization, by recursive calling of the method toXML( ) from the Film object toward the objects of greatest depth. The method Film toXML( ) calls on the toXML( ) method of each of its components, etc.

The breaking down into objects that was used above has the primary advantage of implementing a direct correspondence between certain objects and the Stupeflix atoms: among others, the Effet [plural] correspond to the markers <effect>, the Media [plural] to the markers <image> or <video> according to the type of media file under consideration, the Filtre [plural] to the markers <filter>, the Transition [plural] to the markers <transition>, the Film to the marker <movie>, the Sequence [plural] to the markers <sequence>, the Pile [plural] [Stack] to the markers <stack> and the Audio to the marker <audio>. Thus, the XML file to be obtained is quite simply the XML representation of the Film object that was constructed previously.

As a variant to the use of toXML( ) methods, the use of a library of external methods that implements an automatic object/XML correspondence can be provided.

The XML 130 file describing the constructed video sequence is thus progressively generated, XML fragment corresponding to an object by XML fragment corresponding to another object.

Finally, following the creation of the video sequence in the form of an XML definition file, the processing passes to the generation stage E718, by the server 14, from the video film 140 based on the XML file 130 and media files 122 available in the base 120. This stage is conventional in using the Stupeflix API interface. The latter makes it possible to benefit from the performances of the Stupeflix server, especially for rapidly generating the video film from the XML file.

The video film 140 that has been generated in this way is then transmitted to the user 10 in response to his initial request.

The processing according to the invention thus implements random generation of a video film from a set of media files of memories; this makes it possible to obtain different video films for each new request. This allows the user to resubmit his request as long as the film is not satisfying to him. For this purpose, the intervention of the user is the most simple, limited to the indication of a topic and to the indication (optional) of the criteria of selection of one part of his memories.

Moreover, the analysis of the media files for regrouping them according to coherence criteria and the application of a predefined video motif for the set of media files of the same group guarantees that a coherent visual rendering will be obtained, in a manner that is technically efficient and simple.

The aforementioned examples are only embodiments of the invention that is not limited to them.

In particular, although the aforementioned description relates to the generation of a video sequence, the invention can be applied to the generation of any type of media sequence, and, for example, an audio sequence.

By way of illustration, if memories of a user are composed of, for example, audio recordings of mammals recorded in a zoo on a given date, then audio recordings of a concert on another date, and then audio recordings of traffic noise on another date, and finally audio recordings of birds in a zoo on still another date, the invention makes it possible to obtain audio editing offering high coherence of the audio rendering.

Actually, these recordings are regrouped into four groups according to their dates and a predefined rendering motif is applied to each group that has been composed in this way, i.e., audio concatenations (audio effects) between the recordings of the same group that offer a coherent rendering of these recordings by group.

The invention claimed is:

1. A process for creating a media sequence based on media files, comprising:
    obtaining a selection of media files from at least a user terminal;
    regrouping, with a processing server, the selected media files into a plurality of groups according to at least one coherence criterion which reflects the coherence of the media rendering for the media files belonging to the same group;
    for each group among the plurality of groups,
        selecting a subset of media motifs in a library comprising media motifs, each media motif defining a media rendering of media files, the media rendering comprising the video and/or audio rendering of the media files in a media sequence, and
            each media motif having a size which is the range of numbers of media files of which the media motif can define the media rendering,
        said selection comprising selecting only the media motifs which size is greater than or equal to the number of media files of said each group,
    and
        selecting, in this subset of media motifs, a single media motif so that said single media motif is able to define a media rendering for the totality of media files of said each group; and
    generating a media sequence by assembling the selected media motifs and the media files associated with the selected media motifs.

2. The process according to claim 1, wherein the selection of the media motif within said determined subset is a function of a random value and a weighting associated with each media motif of said subset.

3. The process according to claim 1, wherein the regrouping comprises running through the media files in a chronological order and regrouping the media files according to two combined time criteria, the two combined time criteria comprising a time gap relative to the oldest media file in the group and a time gap relative to the last media file inserted into the group.

4. The process according to claim 3, wherein the regrouping of the media files takes into account a criterion of similarity between description data associated with the media files of the group, taken two by two.

5. The process according to claim 1, wherein the regrouping comprises forming groups of media files according to said at least one coherence criterion and fusing adjacent groups formed according to said at least one coherence criterion and that each comprise fewer media files than a predefined threshold value of fusion.

6. The process according to claim 1, wherein the regrouping comprises forming groups of media files according to said at least one coherence criterion and subdividing one group formed according to said at least one coherence criterion as a function of the number of media files that comprise said one group and of a predefined subdivision threshold value, in such a way as to obtain a plurality of subdivided groups composed of a number of media files that is less than said predefined subdivision threshold value.

7. The process according to claim 1, wherein one media motif comprises at least one elementary component that is designed to receive an identification of a media file for defining the media rendering of the media file, and wherein the process further comprises adjusting the media motif selected by repeating said at least one elementary component in such a way as to obtain one adjusted media motif having one elementary component for each media file of said corresponding group.

8. The process according to claim 1, wherein the process for creating a media sequence is implemented using object-oriented programming provided with classes of objects defining the predefined media motifs and elementary components that comprise the predefined media motifs.

9. The process according to claim 1, wherein one media motif is composed of an initial time sequence of elementary components designed to each receive an identification of a media file, followed by a stack of at least two intermediate time sequences of elementary components, the stack being followed by a final time sequence of elementary components.

10. The process according to claim 9, wherein the assembling media motifs comprises:
    constructing a media block corresponding to each group by duplicating the objects comprising the selected media motif and by indicating, in these objects, the identifications of the media files of said group, and
    converting the objects of each media block into one structured definition file of the media sequence.

11. The process according to claim 10, wherein the converting the objects comprises serializing the objects in a computer marking language.

12. The process according to claim 10, wherein the media block comprises a video block.

13. A device for creation of a media sequence based on media files, comprising a system with a processing server connected to a communication network, said system comprising a processor which:
    obtains one selection of media files from at least a user terminal through said communication network;
    regroups selected media files into a plurality of groups according to at least one coherence criterion which reflects the coherence of the media rendering for the media files belonging to the same group;
    for each group among the plurality of groups,
        selects a subset of media motifs in a library comprising media motifs,
            each media motif defining a media rendering of media files, the media rendering comprising the video and/or audio rendering of the media files in a media sequence, and each media motif having a size which is the range of numbers of media files of which the media motif can define the media rendering, said selection comprising selecting only the media motifs which size is greater than or equal to the number of media files of said each group, and selects, in this subset of media motifs, a single media motif so that said single media motif is able to define a media rendering for the totality of media files of said each group; and generates a media sequence by assembling the selected media motifs and the media files associated with the selected media motifs.

14. A non-transitory computer-readable medium comprising a computer program product stored thereon that can be read by a microprocessor and that comprises instructions for implementing the process for creation according to claim 1, when the program is loaded and executed by the microprocessor.

15. A process for creating a media sequence based on media files, comprising:

obtaining a selection of media files from at least a user terminal;

regrouping, with a processing server, the selected media files into a plurality groups according to at least one coherence criterion which reflects the coherence of the media rendering for the media files belonging to the same group;

for each group among the plurality of groups, selecting a subset of media motifs in a library comprising media motifs, each media motif defining a media rendering of media files, the media rendering comprising the video and/or audio rendering of the media files in a media sequence, and each media motif having a size which is the range of numbers of media files of which the media motif can define the media rendering, said selection comprising selecting only the media motifs which size is greater than or equal to the number of media files of said each group, and selecting, in this subset of media motifs, a single media motif so that said single media motif is able to define a media rendering for the totality of media files of said each group; and generating a media sequence by assembling the selected media motifs and the media files associated with the selected media motifs;

wherein the number of media files, of which one media motif can jointly define the media rendering, is variable over a range of values by repetition of at least one constituent elementary component of the media motif, and the determining comprises determining the media motifs whose associated range of values includes the number of media files of said group.

* * * * *